US007934666B2

(12) United States Patent
Foldyna et al.

(10) Patent No.: US 7,934,666 B2
(45) **Date of Patent: *May 3, 2011**

(54) METHOD OF GENERATION OF PRESSURE PULSATIONS AND APPARATUS FOR IMPLEMENTATION OF THIS METHOD

(75) Inventors: Josef Foldyna, Vaéa ské Mezirici (CZ); Branislav Svehla, Nové Mesto Nad Vàhon (CZ)

(73) Assignee: Institute of Geonics ASCR, V.V.I., Ostrava-Poruba (CZ)

( * ) Notice: Subject to any disclaimer, the term of this patent is extended or adjusted under 35 U.S.C. 154(b) by 0 days.

This patent is subject to a terminal disclaimer.

(21) Appl. No.: 12/717,719

(22) Filed: Mar. 4, 2010

(65) Prior Publication Data

US 2010/0155502 A1 Jun. 24, 2010

Related U.S. Application Data

(63) Continuation of application No. 11/908,528, filed as application No. PCT/IB2006/050774 on Mar. 13, 2006, now Pat. No. 7,740,188.

(30) Foreign Application Priority Data

Mar. 15, 2005 (CZ) ............................... PV 2005-168

(51) Int. Cl.
*B05B 1/08* (2006.01)
*G01N 29/04* (2006.01)
*G01N 29/14* (2006.01)
*B05B 17/06* (2006.01)

(52) U.S. Cl. ..................... 239/102.2; 239/102.1; 73/644

(58) Field of Classification Search ........... 239/4, 102.1, 239/102.2, 589; 73/632, 644, 645
See application file for complete search history.

(56) References Cited

U.S. PATENT DOCUMENTS

| | | | | |
|---|---|---|---|---|
| 3,255,626 | A * | 6/1966 | Van der Veer | 73/644 |
| 3,946,599 | A * | 3/1976 | Patt | 73/644 |
| 4,393,991 | A * | 7/1983 | Jeffras et al. | 239/102.2 |
| 4,738,139 | A * | 4/1988 | Blessing et al. | 73/644 |
| 5,154,347 | A * | 10/1992 | Vijay | 239/4 |
| 5,431,342 | A * | 7/1995 | Saripalli et al. | 239/102.2 |
| 6,623,444 | B2 * | 9/2003 | Babaev | 604/22 |
| 7,117,741 | B2 * | 10/2006 | Klein et al. | 73/579 |

* cited by examiner

*Primary Examiner* — Darren W Gorman
(74) *Attorney, Agent, or Firm* — Notaro, Michalos & Zaccaria P.C.

(57) ABSTRACT

An acoustic generator of pressure pulsations includes a cylindrical waveguide which is caused to vibrate at a low amplitude by an electromechanical transducer. The vibration of the cylindrical waveguide creates low amplitude pressure pulsations in an acoustic chamber containing stationary pressure fluid. A mechanical amplifier, which is part of the acoustic chamber, amplifies the low amplitude pressure pulsations generated by the cylindrical waveguide.

7 Claims, 1 Drawing Sheet

METHOD OF GENERATION OF PRESSURE PULSATIONS AND APPARATUS FOR IMPLEMENTATION OF THIS METHOD

CROSS REFERENCE TO RELATED APPLICATION

This is a continuation of U.S. application Ser. No. 11/908,528 filed Sep. 13, 2007 and now U.S. Pat. No. 7,740,188, which is a 371 application of PCT/IB2006/050774 filed Mar. 13, 2006, both of which are incorporated here by reference, and which claims priority on Czech Republic application number PV 2005-168 filed Mar. 15, 2005; all of which priority claims is repeated herein.

TECHNICAL FIELD

The present invention relates to a method of generation of pressure pulsations for generating pulsating liquid jets and an apparatus for implementation of the method.

BACKGROUND ART

Continuous liquid jets are commonly used for cutting and disintegration of various materials, for cleaning and removal of surface layers and coatings. Generating of sufficiently high pressure pulsations in pressure liquid upstream from the nozzle exit (so called modulation) enables to generate a pulsating liquid jet that emerges from the nozzle as a continuous liquid jet and it not forms into pulses until certain standoff distance from the nozzle exit. The advantage of such a pulsating jet compared to the continuous one consists in fact that the initial impact of pulses of pulsating jet on the target surface generates impact pressure that is several times higher than stagnation pressure generated by the impact of continuous jet under the same conditions. In addition, the impact of pulsating jet induces also fatigue stress in target material due to cyclic loading of the target surface. This further improves an efficiency of the pulsating liquid jet compared to the continuous one.

At present, several types of devices intended for generation of pulsating liquid jets are available. Internal mechanical flow modulators are mechanical devices integrated in the nozzle. They are formed essentially by channeled rotor placed upstream the nozzle exit. The rotor cyclically changes resistance of flow by its rotation and thus modulates velocity of the jet emerging from the nozzle (E. B. Nebeker: Percussive Jets—State-of-the-Art, Proceedings of the 4th U.S. Water Jet Symposium, WJTA, St. Louis, 1987). The main shortcoming of the above mentioned principle is very low lifetime of moving components in the nozzle.

Modulation of continuous liquid jets by Helmholtz oscillator is based on the fact that changes in flow cross-section and/or flow discontinuities provoke periodical pressure fluctuations in flowing liquid (Z. Shen & Z. M. Wang: Theoretical analysis of a jet-driven Helmholtz resonator and effect of its configuration on the water jet cutting property, Proceedings of the 9th International Symposium on Jet Cutting Technology, BHRA, Cranfield, 1988). The same physical principle is used in so-called self-resonating nozzles. Certain type of shock pressure is developed when liquid flows over exit of resonating tube. The shock pressure is carried back to the tube inlet where it creates standing wave by addition with pressure pulsations. If frequency of the shock pressure corresponds to natural frequency of the flow, pressure resonance occurs and the jet starts to create discrete annular vortexes that result in generation of cavitations and/or pulses. (G. L. Chahine et al.: Cleaning and cutting with self -resonating pulsed water jets, Proceedings of the 2nd U.S. Water Jet Symposium, WJTA, St. Louis, 1983). The primary disadvantage of the above mentioned devices is low depth of modulation of liquid jet.

An ultrasonic nozzle for modulation of high-speed water jet is based on a vibrating transformer placed upstream in the vicinity of the nozzle exit in such a way that pressurized fluid flows through annulus between the transformer and nozzle wall. The vibrating transformer is connected to magnetostrictive and/or piezoelectric transducer. The transformer generates highly intensive ultrasound field upstream of the nozzle exit that modulates high-speed water jet escaping from the nozzle (M. M. Vijay: Ultrasonically generated cavitating or interrupted jet, U.S. Pat. No. 5,154,347, 1992). High wear of the tip of vibrating transformer due to intense cavitational erosion, increased dimensions and weight of cutting tool rank among the most important drawbacks of the above mentioned device. The level of modulation is strongly dependent on the position of the tip of the vibrating transformer with respect to the nozzle exit. In addition to that, the ultrasonic nozzle device does not allow utilizing of existing cutting tools for continuous water jets, which significantly increases costs of its implementation in industrial practice.

DISCLOSURE OF THE INVENTION

The present invention is directed to a method of acoustic generation of pulsations of liquid jet and an apparatus for implementation of the method.

The method according to the present invention consists in that pressure pulsations are generated by acoustic actuator in acoustic chamber filled with pressure liquid; the pressure pulsations are amplified by mechanical amplifier of pulsations and transferred by liquid waveguide fitted with pressure liquid feed to the nozzle and/or nozzle system. Liquid compressibility and tuning of the acoustic system, consisting of acoustic actuator, acoustic chamber, mechanical amplifier of pulsations and liquid waveguide, are utilized for effective transfer of pulsating energy from the generator to the nozzle and/or nozzle system. The acoustic system can be complemented with tuneable resonant chamber allowing resonant tuning of the acoustic system.

Unlike the ultrasonic nozzle device (M. M. Vijay: Ultrasonically generated cavitating or interrupted jet, U.S. Pat. No. 5,154,347, 1992), the acoustic generator of pulsations according to the present invention is not sensitive to the accurate setting of the position of the acoustic actuator in the acoustic chamber and the acoustic actuator is not subjected to the immense wear due to an intensive cavitation erosion.

The method and the apparatus for acoustic generation of pulsations of liquid jet according to the present invention allow transmitting of pressure pulsations in the liquid over longer distances as well. Therefore, the generator of pulsations can be connected into the pressure system between a pressure source and working (jetting) tool equipped with nozzle(s) at the distance up to several meters from the working tool. Thanks to that, during generation of pulsations of liquid jet according to present invention it is possible not only to better protect the generator of pulsations against adverse impacts of the working environment in close proximity of the working tool but also to utilize standard working tools that are commonly used in work with continuous jets. This can significantly reduce costs of implementation of the technology of pulsating liquid jets in the industrial practice.

DESCRIPTION OF THE DRAWINGS

The present invention will be even more clearly understandable with reference to the drawings appended hereto, in which.

EXAMPLES

Example 1

Figure 1:
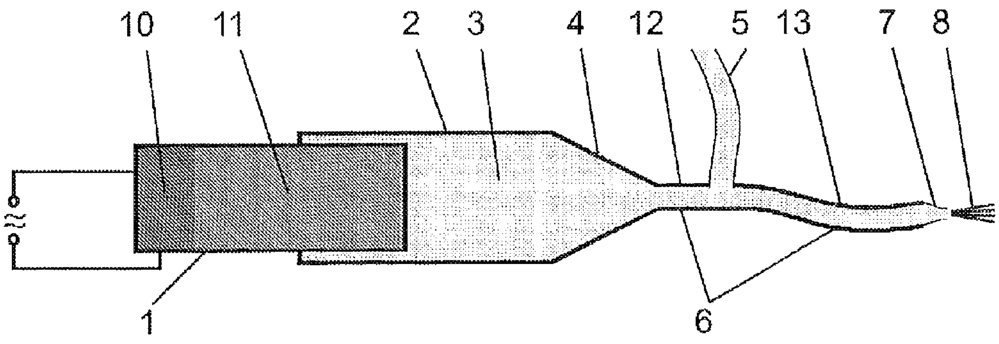
FIG. 1 is a schematic cross-sectional view of an apparatus for implementation of a method of generation of pressure pulsations for generating pulsating liquid jets according to the present invention utilizing direct action of an acoustic actuator on the pressure liquid in the acoustic chamber.

FIG. 1 is a schematic cross-sectional view of an apparatus for implementation of a method of generation of pressure pulsations for generating pulsating liquid jets according to the present invention utilizing direct action of an acoustic actuator on the pressure liquid in the acoustic chamber. Acoustic actuator 1, consisting of piezoelectric transducer 10 and cylindrical waveguide 11, transforms supplied electric power into mechanical vibration. Cylindrical waveguide 11. with diameter of 38 mm inserted into the cylindrical acoustic chamber 2 with diameter of 40 mm and filled with pressure liquid 3 transmits mechanical vibration into the liquid. As a result, pressure pulsations are generated in the pressure liquid 3. Pressure pulsations of the liquid are amplified in mechanical amplifier of pulsations 4 in the shape of cone frustum and transposed into the flowing pressure liquid at the point of connection to the pressure distribution 5 of the apparatus for application of liquid jet. Pressure pulsations are transferred by a liquid waveguide 6 from the mechanical amplifier of pulsation 4 to the nozzle and/or nozzle system 7 (i.e. to the working tool). The liquid waveguide 6 consists of metal tube 12 and hose 13. Pressure pulsations of liquid are used for generation of pulsating liquid jet 8 in the nozzle and/or nozzle system 7.

Example 2

Figure 2:
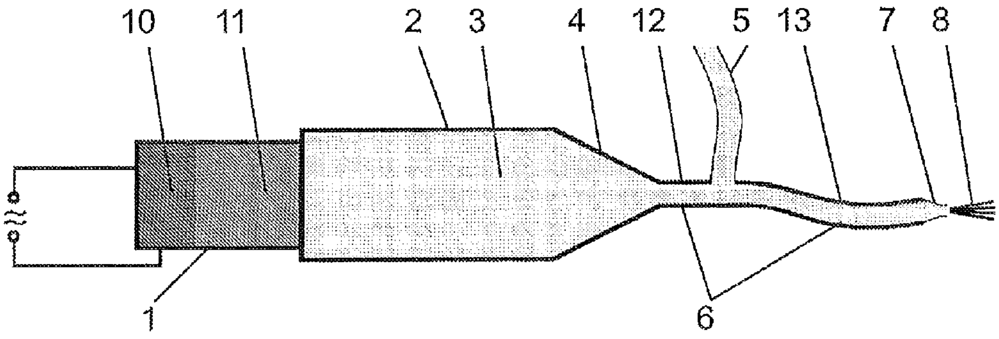
FIG. 2 is a schematic cross-sectional view of an apparatus for implementation of a method of generation of pressure pulsations for generating pulsating liquid jets according to the present invention utilizing indirect action of an acoustic actuator on the pressure liquid in the acoustic chamber via the wall of the acoustic chamber.

FIG. 2 is a schematic cross-sectional view of an apparatus for implementation of a method of generation of pressure pulsations for generating pulsating liquid jets according to the present invention utilizing indirect action of an acoustic actuator on the pressure liquid in the acoustic chamber via the wall of the acoustic chamber. Acoustic actuator 1 , consisting of piezoelectric transducer 10 and cylindrical waveguide 11, transforms supplied electric power into mechanical vibration. Cylindrical waveguide 11 with diameter of 38 mm is fixed to the wall of the cylindrical acoustic chamber 2 with diameter of 40 and filled with pressure liquid 3. Mechanical vibration of cylindrical waveguide 11 oscillates the wall of the cylindrical acoustic chamber 2 that transmits the oscillations into the pressure liquid 3. As a result, pressure pulsations are generated in the pressure liquid 3. Pressure pulsations of the liquid are amplified in mechanical amplifier of pulsations 4 in the shape of cone frustum and transposed into the flowing pressure liquid at the point of connection to the pressure distribution 5 of the apparatus for application of liquid jet. Pressure pulsations are transferred by a liquid waveguide 6 from the mechanical amplifier of pulsations 4 to the nozzle and/or nozzle system 7 (i.e. to the working tool). The liquid waveguide 6 consists of metal tube 12 and hose 13. Pressure pulsations of liquid are used for generation of pulsating liquid jet 8 in the nozzle and/or nozzle system 7.

Example 3

Figure 3:
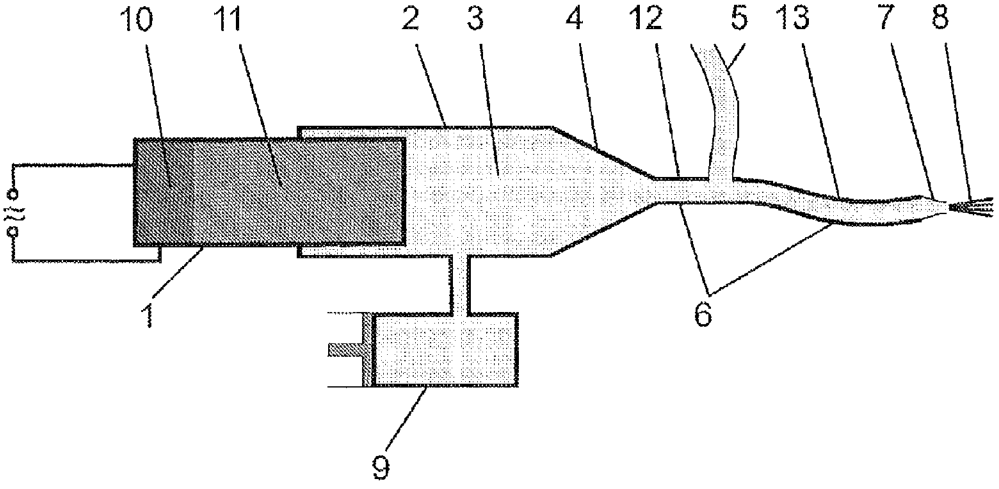
FIG. 3 is a schematic cross-sectional view of an apparatus for implementation of a method of generation of pressure pulsations for generating pulsating liquid jets according to the present invention utilizing direct action of an acoustic actuator on the pressure liquid in the acoustic chamber and equipped with a tuneable resonant chamber.

FIG. 3 is a schematic cross-sectional view of an apparatus for implementation of a method of generation of pressure pulsations for generating pulsating liquid jets according to the present invention utilizing direct action of an acoustic actuator on the pressure liquid in the acoustic chamber equipped with a tuneable resonant chamber. Acoustic actuator 1, consisting of piezoelectric transducer 10 and cylindrical waveguide 11, transforms supplied electric power into mechanical vibration. Cylindrical waveguide 11 with diameter of 38 mm inserted into the cylindrical acoustic chamber 2 with diameter of 40 mm and filled with pressure liquid 3 transmits mechanical vibration into the liquid. As a result, pressure pulsations are generated in the pressure liquid 3. Acoustic chamber 2 is connected with a tuneable resonant chamber 9 that serves for matching of natural frequency of the acoustic system to the driving frequency of pressure pulsations. Pressure pulsations of the liquid are amplified in mechanical amplifier of pulsations 4 in the shape of cone frustum and transposed into the flowing pressure liquid at the point of connection to the pressure distribution 5 of the apparatus for application of liquid jet. Pressure pulsations are transferred by a liquid waveguide 6 from the mechanical amplifier of pulsations 4 to the nozzle and/or nozzle system 7 (i.e. to the working tool). The liquid waveguide 6 consists of metal tube 12 and hose 13. Pressure pulsations of liquid are used for generation of pulsating liquid jet 8 in the nozzle and/or nozzle system 7.

INDUSTRIAL APPLICABILITY

Solution according to the present invention can be utilized in many industrial branches, such as mining (rock cutting, quarrying and processing of ornamental and dimension stones), civil engineering (repair of concrete structures, surface cleaning), and engineering (surface layer removal, cleaning, and cutting).

The invention claimed is:

1. An apparatus for generating of liquid jet pulsations characterized in that it is composed of an acoustic system consisting of an acoustic actuator (1) connected to an electric power source, said acoustic actuator (1) comprising an electromechanical transducer (10) and a cylindrical waveguide (11), the cylindrical waveguide (11) having an emissive area that pulsates in a cylindrical portion of an acoustic chamber (2) of the acoustic actuator (1), an internal volume of said acoustic chamber (2) being filled with a pressure liquid (3), wherein a cross-section of the acoustic chamber (2) exceeds the emissive area of the cylindrical waveguide (11) by no more than 20%, said acoustic chamber (2) including a mechanical amplifier of pulsations (4) having a conical shape and a liquid waveguide (6) consisting of metal tubing and/or of hose, said mechanical amplifier of pulsations (4) is connected with a nozzle and/or nozzle system (7) by means of the liquid waveguide (6) that is fitted with a pressure liquid feed (5); said acoustic system is parallelly connected to the pressure liquid feed (5) between the nozzle and/or nozzle system (7) and an exit of the mechanical amplifier of pulsations (4) of the acoustic chamber (2).

2. The apparatus for generating of liquid jet pulsations according to claim 1, wherein the acoustic actuator (1) is partially immersed in the pressure liquid (3) in the acoustic chamber (2).

3. The apparatus for generating of liquid jet pulsations according to claim 1, wherein the acoustic actuator (1) is fixed outside the acoustic chamber (2).

4. The apparatus for generating of liquid jet pulsations according to claim 1, wherein the ratio of length to diameter of the acoustic chamber (2) is greater than 1.

5. The apparatus for generating of liquid jet pulsations according to claim 1, wherein the electromechanical transducer (10) is piezoelectric or magnetostrictive.

6. The apparatus for generating of liquid jet pulsations according to claim 1, characterized in that it includes a tuneable resonant chamber (9) for tuning up of the resonant natural frequency of the acoustic system to the driving frequency of pressure pulsations.

7. The apparatus for generating of liquid jet pulsations according to claim 1, characterized in that liquid waveguide (6) is consisted of metal tubing (12) and hose (13).

* * * * *